J. Richardson.
Harvester Rake.
No. 13102. Patented June 19, 1855.
Fig. 1
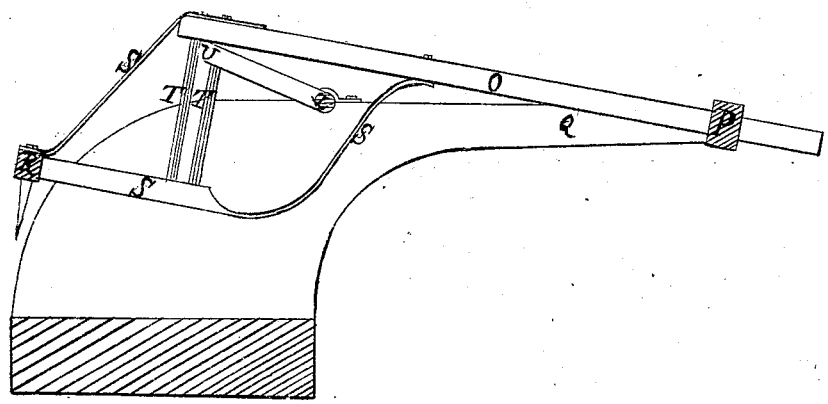
Fig. 2
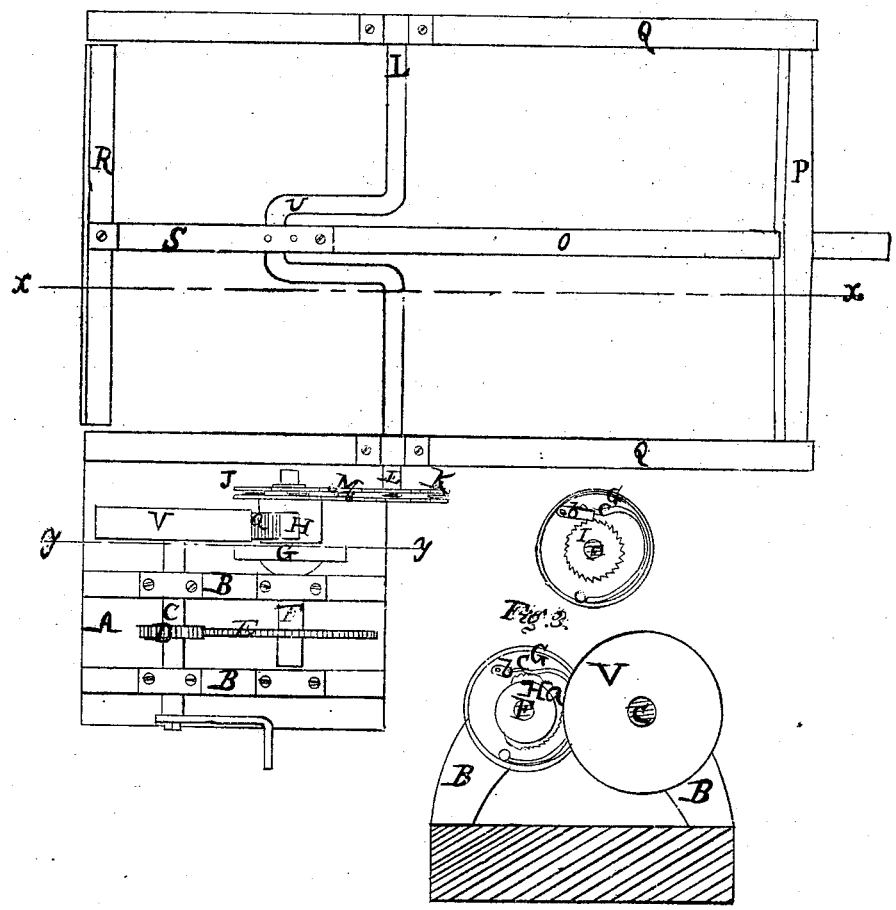
Fig. 3

UNITED STATES PATENT OFFICE.

JOHN RICHARDSON, OF BUCKEYSTOWN, MARYLAND.

IMPROVEMENT IN PRODUCING INTERMITTENT ACCELERATION OF MOTION IN HARVESTER-RAKES, &c.

Specification forming part of Letters Patent No. 13,102, dated June 19, 1855.

*To all whom it may concern:*

Be it known that I, JOHN RICHARDSON, of Buckeystown, in the county of Frederick and State of Maryland, have invented certain new and useful Improvements in Self-Operating Rakes for Harvesting-Machines; and I do hereby declare the following to be a full, clear, and exact description of the same, reference being had to the accompanying drawings, making a part thereof, in which—

Figure 1 represents a vertical section taken at the red line $x\,x$ of Fig. 2. Fig. 2 represents a top plan of the rake and the parts for operating it; and Fig. 3 represents a vertical sectical section taken at the red line $y\,y$ of Fig. 2, and looking toward the bottom of the figure.

Similar letters in the several figures denote like parts.

The nature of my invention relates to the mechanism for giving the rake its forward-and-backward and rising-and-falling motion, and in increasing the backward motion of the rake, so that the grain shall not fall upon it.

To enable others skilled in the art to make and use my invention, I will proceed to describe the same with reference to the drawings.

A may represent the frame of any ordinary reaping-machine, upon which are placed supporting-blocks B B. In suitable bearings in these blocks is placed a shaft, C, which may be driven from any of the moving parts of the reaping-machine. On this shaft C is a spur-wheel, D, which takes into and gives motion to a cogged wheel, E, on the shaft F, which is also supported on the blocks B B. The shaft F also carries a pawl-wheel, G, fast on the said shaft, an eccentric-drum, H, with a ratchet-wheel, I, attached to it, and, finally, a chain-wheel, J, over which and a similar chain-wheel, K, on the crank-shaft L, passes an endless chain, M, for transmitting motion to said crank-shaft.

O is the rake-handle, which passes through a square mortise in the swung shaft P, attached to the side frames, Q, so that the said handle may slide through the mortise as the rake moves forward and back, but so that the shaft P shall rock as the rake moves up and down. The rake-handle is connected to the rake-head R by the straps or pieces S S, forming, as it were, a yoke, in which two parallel pieces, T R, are arranged, between which the crank U on the crank-shaft L works, giving to the rake a forward-and-back and rising-and-falling motion. It is necessary that the rake should have an irregular motion—that is, it should be slow during a portion of its movement and rapid during another portion of it. This is necessary, so that the grain should be removed in gavels or bundles. The rake therefore must move slow enough to allow sufficient grain to collect on the platform to make a gavel; but when the rake commences to rake off the grain it must move fast enough to prevent the falling grain from striking it or resting on it, by which it would be scattered and dribbled along over the ground. To effect the rapid movement of the rake I arrange as follows: On the shaft C is a friction-wheel, V, of wood or other material, and covered with leather or india-rubber, and on the drum H, around a portion of its periphery, is formed a cam or projection, $a$, roughened on its surface, against which the friction-wheel V presses hard enough to turn the drum H and chain-wheel J independent of and with a much more rapid movement than they would receive through the gear-wheels D E. This increased motion given to the rake takes place just as the rake drops upon the grain on the platform, and the grain is thus removed before any of that which is falling strikes the rake.

$b$ is a pawl, (in the pawl-wheel G,) which is held into the ratchet I by a spring, $c$, and when the projection $a$ on the drum H passes beyond the contact with the wheel V the drum H and chain-wheel J are driven with the ordinary velocity of the shaft F by means of the rack and pawl; but when the projection $a$ meets the wheel V the pawl slips over the ratchet, and the drum H, ratchet I, and chain-wheel J being then loose on the shaft F they are free to turn with a velocity due to the motion of the circumference of the wheel V, which accelerates the motion of the rake materially at that part of its movement.

Having thus fully described the nature of my invention, I would state that I am aware that an accelerated motion has been given to grain-rakes on harvesting-machines. This I do not claim; but

What I do claim as new, and desire to secure by Letters Patent, is—

A device for producing an accelerated motion, whether in rakes or for other purposes, said device consisting of the cam $a$ on the drum H and the ratch and pawl I $b$ and friction-wheel V, arranged and operating substantially in the manner set forth.

JOHN RICHARDSON.

Witnesses:
THOMAS H. UPPERMAN,
EMIL COHEN.